(12) United States Patent
Netter et al.

(10) Patent No.: US 11,157,948 B2
(45) Date of Patent: Oct. 26, 2021

(54) METHOD AND SYSTEM FOR INDEPENDENT VALIDATION OF ASSET SERVING

(71) Applicant: INNOVID INC., New York, NY (US)

(72) Inventors: Zvi Izhak Netter, Brooklyn, NY (US); Tal Chalozin, New York, NY (US); Yuval-Zvi Pemper, Shoham (IL); Dror Fadida, Kibutz Beit Oren (IL); Ronen Idrisov, Brooklyn, NY (US)

(73) Assignee: INNOVID, INC., New York, NY (US)

(*) Notice: Subject to any disclaimer, the term of this patent is extended or adjusted under 35 U.S.C. 154(b) by 112 days.

(21) Appl. No.: 16/106,425

(22) Filed: Aug. 21, 2018

(65) Prior Publication Data

US 2019/0066153 A1     Feb. 28, 2019

Related U.S. Application Data

(60) Provisional application No. 62/548,622, filed on Aug. 22, 2017.

(51) Int. Cl.
*G06Q 30/02* (2012.01)
*H04L 29/08* (2006.01)
*G06F 16/955* (2019.01)

(52) U.S. Cl.
CPC ..... *G06Q 30/0246* (2013.01); *G06F 16/9566* (2019.01); *G06Q 30/0277* (2013.01);
(Continued)

(58) Field of Classification Search
CPC  G06Q 30/0246; G06Q 30/0277; H04L 67/22; H04L 67/146; H04L 67/06; H04L 67/12; G06F 16/9566
(Continued)

(56) References Cited

U.S. PATENT DOCUMENTS

| 7,617,124 B1* | 11/2009 | Ronning ............. G06Q 20/40 379/91.01 |
| 2004/0088680 A1* | 5/2004 | Pieper ............... H04L 69/329 717/114 |

(Continued)

FOREIGN PATENT DOCUMENTS

JP     2010140075 A  *  6/2010

OTHER PUBLICATIONS

Charles Clark, What Type of Marketing Assets Do I Need, 2017.*
(Continued)

*Primary Examiner* — Tarek Elchanti
(74) *Attorney, Agent, or Firm* — Tutunjian & Bitetto, P.C.

(57) ABSTRACT

A method, apparatus and computer readable medium for independent validation of asset serving. The method is performed in a network that comprise a Content Distribution Network (CDN) retaining a plurality of assets available for download therefrom. Responsive to receiving an asset serving request, an asset is selected from the plurality of assets, an asset session identifier corresponding to the asset and the asset serving request is generated, and an Asset Serving Template (AST) comprising a Uniform Resource Locator (URL) pointing to the asset is provided, wherein the URL is configured when being used in a download request of the asset from the CDN to effect recordation of the asset session identifier in association with an event logged in an event log responsive to the download request, whereby enabling determining unique asset download request events of a given asset of the plurality of assets based on asset session identifiers corresponding thereto.

22 Claims, 4 Drawing Sheets

(52) U.S. Cl.
CPC .............. *H04L 67/06* (2013.01); *H04L 67/12* (2013.01); *H04L 67/146* (2013.01); *H04L 67/22* (2013.01)

(58) Field of Classification Search
USPC ............................ 705/26.61, 14.45; 715/716
See application file for complete search history.

(56) References Cited

U.S. PATENT DOCUMENTS

2012/0210224 A1* 8/2012 Wong ............... H04N 21/41407
715/716
2017/0093867 A1* 3/2017 Burns ................... H04L 63/107

OTHER PUBLICATIONS

Charles Clark, What Type of Marketing Assets Do I Need, 2017 (Year: 2017).*
Charles Clark, What type pf marketing assets do I need, 2017 (Year: 2017).*

* cited by examiner

METHOD AND SYSTEM FOR INDEPENDENT VALIDATION OF ASSET SERVING

CROSS-REFERENCE TO RELATED APPLICATION

This application claims the benefit of U.S. Provisional Application No. 62/548,622 filed Aug. 22, 2017, entitled "INDEPENDENT ASSET SERVING VALIDATOR", which is hereby incorporated by reference in its entirety without giving rise to disavowment.

TECHNICAL FIELD

The present disclosure relates to online asset delivery in general, and to independent validation of online asset serving, in particular.

BACKGROUND

Modern technology enables serving digital content to users over a computerized network, such as the Internet and the World Wide Web (WWW). Advertisers and marketers strive to deliver digital assets designated for promotional purposes and likewise commercial goals, such as advertisements and the like, to relevant audiences as large as possible. Ad servers and likewise asset serving providers match between those assets and asset serving opportunities offered on various conduits for providing digital content to users, such as websites, application programs ("apps") for mobile devices, and the like. Entities offering asset serving opportunities are referred to as "publishers". As can be readily appreciated, the more user traffic a publisher may garner, the more valuable an asset serving opportunity offered thereby may be.

BRIEF SUMMARY

One exemplary embodiment of the disclosed subject matter is a method performed in a network that comprise a Content Distribution Network (CDN), wherein the CDN retaining a plurality of assets available for download therefrom, wherein the method comprising: responsive to receiving an asset serving request, performing the steps of: selecting an asset from the plurality of assets; generating an asset session identifier corresponding to the asset and the asset serving request; and providing an Asset Serving Template (AST) comprising a Uniform Resource Locator (URL) pointing to the asset, wherein the URL is configured when being used in a download request of the asset from the CDN to effect recordation of the asset session identifier in association with an event logged in an event log responsive to the download request; whereby determining unique asset download request events of a given asset of the plurality of assets based on asset session identifiers corresponding to the given asset recorded in association with events logged in the event log is enabled.

Another exemplary embodiment of the disclosed subject matter is an apparatus having a processor and coupled memory, the apparatus being in communication with a network that comprise a Content Distribution Network (CDN), wherein the CDN retaining a plurality of assets available for download therefrom, the processor being adapted to perform the steps of: responsive to receiving an asset serving request, performing the steps of: selecting an asset from the plurality of assets; generating an asset session identifier corresponding to the asset and the asset serving request; and providing an Asset Serving Template (AST) comprising a Uniform Resource Locator (URL) pointing to the asset, wherein the URL is configured when being used in a download request of the asset from the CDN to effect recordation of the asset session identifier in association with an event logged in an event log responsive to the download request; whereby determining unique asset download request events of a given asset of the plurality of assets based on asset session identifiers corresponding to the given asset recorded in association with events logged in the event log is enabled.

Yet another exemplary embodiment of the disclosed subject matter is a non-transitory computer readable medium retaining program instructions, which program instructions when read by a processor, cause the processor to perform a method in a network that comprise a Content Distribution Network (CDN), wherein the CDN retaining a plurality of assets available for download therefrom, wherein the method comprising: responsive to receiving an asset serving request, performing the steps of: selecting an asset from the plurality of assets; generating an asset session identifier corresponding to the asset and the asset serving request; and providing an Asset Serving Template (AST) comprising a Uniform Resource Locator (URL) pointing to the asset, wherein the URL is configured when being used in a download request of the asset from the CDN to effect recordation of the asset session identifier in association with an event logged in an event log responsive to the download request; whereby determining unique asset download request events of a given asset of the plurality of assets based on asset session identifiers corresponding to the given asset recorded in association with events logged in the event log is enabled.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
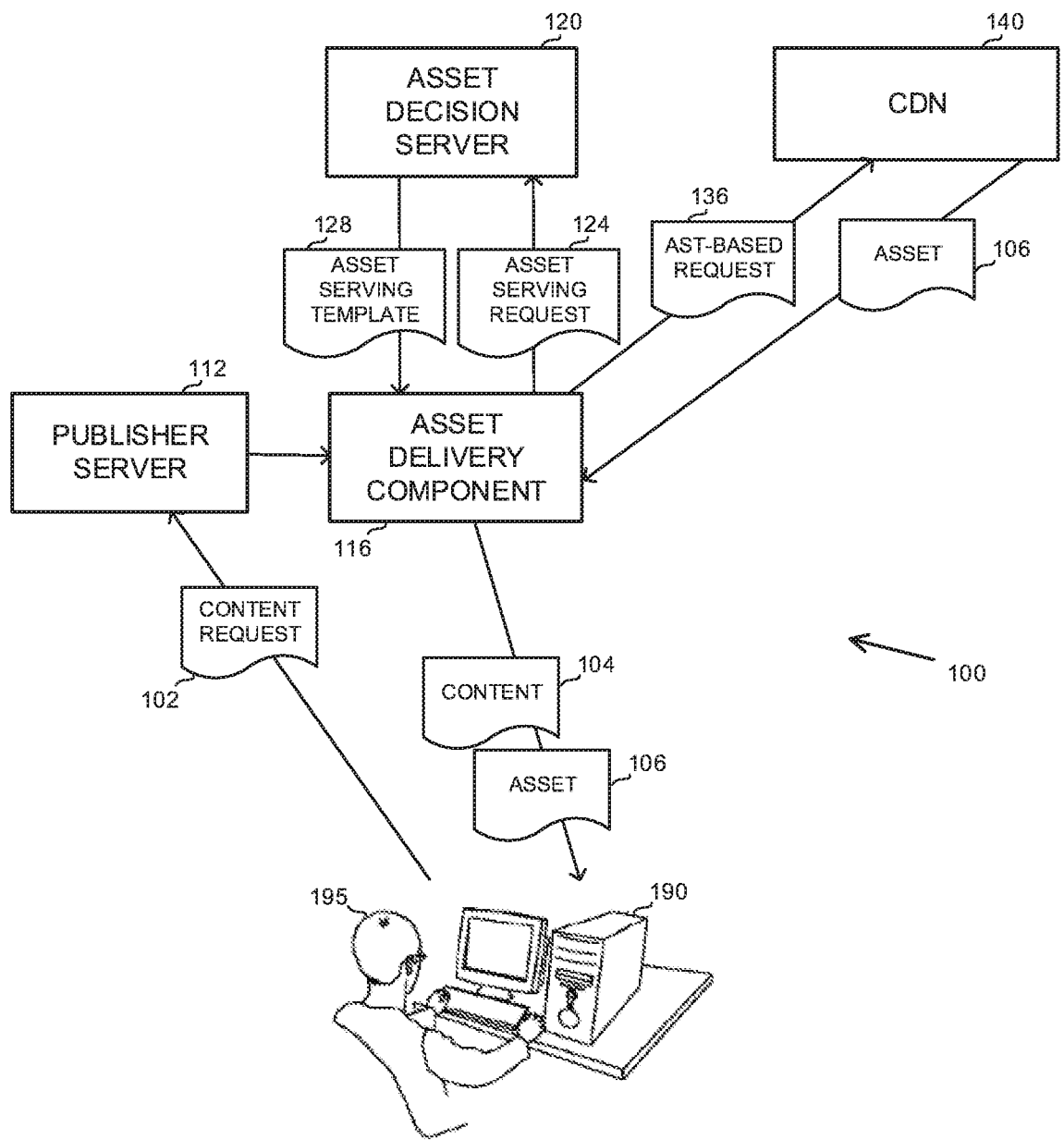
FIG. 1 shows a schematic illustration of an exemplary environment and architecture in which the disclosed subject matter may be utilized, in accordance with some exemplary embodiments of the disclosed subject matter

One technical problem dealt with by the disclosed subject matter is to provide independent validation of asset serving performance. The digital marketing and advertising technology industry nowadays is dominated by several walled garden publishers: Google™/YouTube™, Facebook™ and others. One prominent characteristic of a walled garden publisher of this sort is the inability of asset owners to directly measure asset serving performance on its proprietary platform. These walled gardens provide advertisers with various performance metrics that they cannot corroborate in any way.

The performance metrics may include, for example, impression count, indicating a number of times an asset (e.g., an advertisement) was displayed or otherwise delivered to a user (at least partially); and tracking counts. In some cases, such as with video assets or other assets which are delivered over time, quartile counts, completion counts, or the like, may be provided. Quartile counts may indicate how many of the impressions reached a first quartile, a second quartile, a third quartile, or the like. Similarly, other percentiles may be of interest. Completion counts may indicate how many of the impressions reached their end and completed their delivery. It will be appreciated that, while the disclosed subject matter may be described and exemplified with relation to impression count (or any likewise asset event counts), the disclosed subject matter however is not limited to such metric, and may be applied without loss of generality to other performance metrics as well.

In some cases, a Content Distribution Network (CDN) or likewise technological platform may be employed for storing and delivering assets to user devices per serving requests. The CDN may comprise servers and data centers deployed in multiple locations for distributing service spatially relative to users and providing high availability and high performance. The CDN may be operated by an asset owner or by a CDN vendor of commercially available CDN services, such as Akamai™ and the like.

An asset may be provided by an asset serving service, such as an Asset Decision Server (ADS) or the like, in response to an asset request. The asset request may be issued by an asset delivery component which may be executing on a user device, e.g. by a web browser executing client-side code, by a Software Development Kit (SDK) incorporated within a mobile application embedded in a publisher's platform, or the like. The asset delivery component may be activated during or in response to a request for user access to digital content provided by the publisher. For example, the asset delivery component may be a media player displaying a video stream available for viewing on a media content website, e.g. YouTube™, and the asset may be a pre-roll advertisement displayed prior to the video of interest.

In some cases, the asset serving service may provide in response to the asset request an Asset Serving Template (AST), such as a Video Ad Serving Template (VAST) or the like. The AST may specify details and metadata of an asset, by which an asset delivery component requesting an asset serving may be able to retrieve the asset in question from its whereabouts, e.g. a CDN retaining it, and deliver it to the requesting user device. The AST may use an Extensible Markup Language (XML) schema or any likewise standard format of data and documents encoding.

One technical solution is to correlate between logged events of accesses to assets in a CDN and requests for asset serving corresponding thereto, in order to estimate a number of unique requests to deliver an asset. The estimated count of unique download requests may be used for independently validating impression statistics reported by a publisher or logged by other performance measure means.

In some exemplary embodiments, the AST returned by the asset serving service may comprise a Uniform Resource Locator (URL) pointing to the asset, such as, for example, an address of a CDN node and file system path wherein the asset is retained. The asset may then be downloaded from the location specified by the URL to a user device. Each request carried out to download an asset may be logged, such as, for example, in an event log managed by the respective CDN. The logged information may include, but it is not limited to, one or more of the following: a client IP address, a timestamp of the request, a cookie header, a device ID (e.g. a MAC address), a full URL of the request (which may include additional information embedded therein, such as HTTP POST parameters), a user agent (e.g. a web browser type, version, etc.), all HTTP headers included in the request, an HTTP status code of the response, an amount of time required to start responding to the request, an amount of time required to complete responding to the request, or the like.

In some cases, a single asset serving may be represented by several events in the CDN log. For example, the asset may be downloaded by an asset delivery component in portions, invoking an asset download request each time with a different range. Multiple requests may also provide a speedup in the downloading process, such as due to implementation details of the Transmission Control Protocol (TCP). In some cases, the status code of the HTTP download requests may be 206, representing partial content successfully transferred. Hence, in one impression event there may be multiple logged events representing multiple download requests based on the AST.

In some exemplary embodiments, the URL provided within the AST that points to the asset, may be instrumented with a unique or pseudo-unique identifier by which an impression session initiated by the request may be determined. Such identifier, referred to in the present disclosure as an asset session identifier, may comprise or encode one or more of the following asset-related information: an asset identifier (e.g., a file name), an identification of a placement of the asset (e.g. a location in a publisher's webpage), an identification of a campaign to which the asset belongs, an identification of an owner of the asset, or the like. Additionally or alternatively, the asset session identifier may comprise information such as a timestamp of the request, or any one or more of likewise unique or pseudo-unique parameters associated therewith, e.g. a client Internet Protocol (IP) address, a device ID, and so forth. The URL may be configured to effect recordation of the asset session identifier in an event log responsive to the URL being accessed, e.g. in a request to download the asset from the CDN. In some exemplary embodiments, the asset session identifier may be incorporated into the URL as a query parameter. Additionally or alternatively, the asset session identifier may be provided when accessing the CDN using a GET HTTP parameter, a POST HTTP parameter, or the like.

Another technical solution is to analyze the CDN event log to determine performance metrics of an asset or estimation thereof. In some exemplary embodiments, the log may be analyzed to determine, for example, unique asset download initiation count, impression count, completion count, or the like.

In some exemplary embodiments, events logged in the event log of the CDN may be clustered according to one more logged characteristics by which a unique user session may be identified or estimated. For example, for any access events of assets on the CDN, one or more of the following information items may be logged and used to determine a unique user session that triggered the accessing: a client IP address, a timestamp of the AST generation time, a user agent, a cookie header, a device ID, or the like. In some exemplary embodiments, a timestamp for each event log may be obtained. The timestamp may be a timestamp of the event according to the log. Additionally or alternatively, the timestamp may be a timestamp of the creation of the AST. In some exemplary embodiments, the timestamp of the AST creation time may be obtained from the full URL of the asset, which may indicate such information, and may be logged in the event log in addition to or in lieu of other information items. In some exemplary embodiments, the full URL of the asset may comprise a unique asset session identifier, which may be incorporated therein by an asset serving service providing the AST containing the URL, in accordance with the disclosed subject matter.

Each cluster of events for which a same user session is identified or estimated may be considered as events belonging to the same user during the same session. Each cluster may include multiple asset serving requests originated during the session. Each cluster may be further split into sub-clusters based on a timestamp of each of the events comprised therein. Each sub-cluster may comprise events within a predetermined time range. A large enough difference may be indicative of a different unique occurrence. The predetermined time difference threshold may be provided as input by a user, learned automatically using supervised learning techniques, or the like. Each of the sub-clusters thus obtained may be considered as pertaining to a different, unique request for download of an asset.

In some exemplary embodiments, reports on initiations, impressions, quartiles, completion events and the like may be obtained using respective tracking pixels, also referred to as beacons in measurement guidelines of the Media Rating Council (MRC) and Interactive Advertising Bureau (IAB). In some exemplary embodiments, a tracking pixel may be a URL that may be accessed to report an event. Different URLs may provide different reported events. In some cases, the URL may also return an image, such as of a 1×1 pixel, which may not be visibly notable to a user and be effectively invisible to the user. A beacon URL may be configured to be accessed responsive to a predetermined condition being met. For example, quartile tracking pixels may be accessed when an asset delivery reached a first, second, third, and fourth quartile, respectively. In some exemplary embodiments, invocation of the beacon URLs may be in control of the publisher. A publisher's platform or asset delivery component, such as media player, may invoke beacon URLs in an inaccurate manner, causing for an inaccurate indication of asset consumption.

In some exemplary embodiments, unique asset download events determined based on the log analysis may be matched to their corresponding reports using the beacons. The matching may be performed based on a time at which the asset was served, based on a portion of the asset that was served (e.g., matching a third quartile beacon-based event with a download event of a portion of the asset at about (e.g., ±20%) the third quartile), or the like. By ensuring each reported event has a corresponding logged event or group of events, it may be determined that the report is correct and that it resulted from an actual asset download. A reported event using a beacon that has no corresponding asset download event that can be matched thereto, may be deemed invalid. Additionally or alternatively, there may be asset download events that may not be reported by beacon-based reports. Possible causes for such invalid reported events can be software bugs on the publisher side, fraud, or the like.

Additionally or alternatively, a total number of unique asset initiations, impressions, quartiles, and completions may be counted per asset within a timeframe. Such metric counters may be correlated to corresponding counters within the same timeframe that are based on the beacons-based reports for the same asset.

In some exemplary embodiments, a publisher may disable usage of tracking pixels or reject ASTs containing them, in which case asset performance cannot be measured in this way. Using information from the event log may thus provide an alternative means for validating impression statistics reported by the publisher. In some exemplary embodiments, such alternative means cannot be circumvented by the publisher.

In some exemplary embodiments, the event log may be utilized to extract unique viewer and frequency count metrics for an asset.

In some exemplary embodiments, GEO-IP-based validation may be performed based on the client IP address as appearing in the event log. In some cases, asset usages may be reported based on geographical territories, and using IP addresses, the location of the client may be determined.

In some exemplary embodiments, only a sample of the event log may be used, instead of the entirety thereof. In some cases, only a sample of the CDN event data may be logged. The determination of whether to log a CDN event may be determined when the event occurs or before. For example, a request for an AST may be responded to with a logable link. The link may be logged when accessed thereto, or may indicate that the information should be logged in another way. As an example, one in every ten AST requests would return a logable link, and the rest of the requests may return a regular link, which the access thereto may not be logged. Additionally or alternatively, the sample of the CDN data may be selected a posteriori. Additionally or alternatively, logs may be maintained with respect to only a portion of the CDN nodes. Based on load-balancing techniques, each CDN node may be utilized, on average, to a same degree, providing for a representative sample.

In some exemplary embodiments, URL hashing may be employed to protect it from tampering, e.g. of the AST or event log.

In some exemplary embodiments, validation may be based on asset request calls to the CDN instead of or in addition to, asset serving requests. In some exemplary embodiments, requests for ASTs may be logged and counted to validate impression counts reported by the publisher.

In some exemplary embodiments, the beacon-based reports may be validated based on funnel analysis of the asset serving services (e.g., ad servers), CDN event logs, or the like. In some exemplary embodiments, the funnel-based validation may be performed based on event matching throughout the funnel (e.g., a digital path of the user, such as a chain of linked web pages accessed by the user agent), by total count correlation within timeframes, or the like.

In some exemplary embodiments, the disclosed subject matter may be utilized to initiate real time asset blocking. Real-time analysis of the event log may be performed, and based thereon, asset serving may be blocked to specific publishers or users, to prevent fraud attempts, to mitigate resource waste that is associated with software bugs, or the like. Additionally or alternatively, a posteriori analysis may be performed and blockage may be implemented in a prospective manner.

In some exemplary embodiments, the disclosed subject matter may be applicable to static assets, such as images. In some cases, the static assets may be companion assets to video assets, such as disclosed in U.S. Pat. No. 9,665,965, which is hereby incorporated by reference in its entirety without giving rise to disavowment. In some exemplary embodiments, correlation between companion asset counts and main asset counts may also be performed as part of the validation process.

One technical effect of utilizing the disclosed subject matter is to allow an asset owner or asset serving service to effectively corroborate the general correctness of the performance metrics which were provided by the publisher.

The disclosed subject matter may provide for one or more technical improvements over any pre-existing technique and any technique that has previously become routine or conventional in the art. Additional technical problem, solution and effects may be apparent to a person of ordinary skill in the art in view of the present disclosure.

Referring now to FIG. 1 showing a schematic illustration of an exemplary environment and architecture in which the disclosed subject matter may be utilized, in accordance with some exemplary embodiments of the disclosed subject matter.

As exemplified in FIG. 1, a Computerized Environment 100 may comprise a Publisher Server 112, which may retain a plurality of digital content items. In some cases, Publisher Server 112 may retain an index of the plurality of digital content items that are stored elsewhere, such as in a CDN 140. Publisher Server 112 may be accessed by a User 195 operating a Device 190, such as mobile device, laptop, PC computer, tablet, or the like, via a computerized network communication channel, such as the Internet. User 195 may request to access a digital content item retained in Publisher Server 112, such as Content 104, and accordingly send a corresponding Content Request 102 to Publisher Server 112 from Device 190. For example, Publisher Server 112 may be a content publishing platform, such as YouTube™, and User 195 may request access to content posted thereon, such as a certain video clip.

Publisher Server 112 may be configured to serve the digital content item Content 104 to users such as User 195 together with an Asset 106, e.g. for monetization purposes or the like. Asset 106 may be, for example, a pre-roll advertisement, an overlay advertisement, a static image advertisement, an interactive object advertisement, or the like. Accordingly, Asset 106 may be served either prior to, concurrently, or after Content 104. For example, Asset 106 may be stitched into Content 104, presented on top thereof or in a near vicinity thereto, and the like.

In some exemplary embodiments, Publisher Server 112 may serve Content 104 and Asset 106 using an Asset Delivery Component 116. Asset Delivery Component 116 may be a specialized software component for delivering assets, such as, for example, a media player or the like. In some exemplary embodiments, Publisher Server 112 may provide Asset Delivery Component 116 as a client-side executable computer program code, which may be executed on Device 190 by a client-side user agent, such as a web browser, a mobile application, or the like. Alternatively, Asset Delivery Component 116 may be executed on Publisher Server 112 and Asset 106 may be tunneled through it to Device 190.

Asset Delivery Component 116 may send an Asset Serving Request 124 to an Asset Decision Server 120. Asset Serving Request 124 may comprise information based thereon Asset Decision Server 120 may determine which asset should be delivered to User 195. Such information may comprise, for example, data or prediction about user demographics, as obtained from Publisher Server 112 or extracted from browsing history of User 195 and likewise documents on Device 190, geo-location data, settings and definitions of Device 190 (e.g. language, programs installed, etc.), or any likewise information deemed relevant. Additionally or alternatively, the information may comprise data related to the requested content item Content 104, to Publisher Server 112, or both. For example, the information may comprise data related to an intended placement of the requested asset serving or the like. In some cases, the information may comprise an identification of the user, to enable use of user's history in matching an asset for User 195 with respect to Content 104. For example, User 195 may have clicked on certain ads in the past, and based on such information similar ads may be shown. Additionally or alternatively, other users with similar characteristics as User 195, have interacted with certain assets when delivered with respect to Content 104 or to similar digital content. Such information may be used in matching Asset 106 out of a plurality of potential assets that may be delivered together with Content 104, with respect to User 195.

Asset Decision Server 120 may generate and return to Asset Delivery Component 116 in response to Asset Serving Request 124 an Asset Serving Template (AST) 128 pointing to a location of Asset 106 determined as the asset to be served. Asset 106 may be located in a CDN 140. Asset Delivery Component 116 may then access Asset 106 at CDN 140 using Asset Serving Template 128. Asset Delivery Component 116 may send an AST-Based Request 136 to CDN 140 to receive Asset 106 and deliver it together with Content 104 to User 195 on Device 190.

In some exemplary embodiments, CDN may log AST-Based Request 136 together with identification of the asset provided in response thereto. In some exemplary embodiments, the log may include an asset session identifier. The asset session identifier may be incorporated into a URL within Asset Serving Template 128. Additionally or alternatively, the asset session identifier may be determined by CDN 140 in response to AST-Based Request 136. In some exemplary embodiments, CDN 140 may log indications on portions of Asset 106 that were provided in response to AST-Based Request 136. In some cases, Asset Delivery Component 116 may issue multiple requests to retrieve Asset 106 in the same session, each of which relating to different portions thereto. In some cases, Asset Delivery Component 116 may fetch a beginning portion of a video asset, for example, and while the beginning portion is being shown, retrieve subsequent portions of the video asset. In some cases, the portions may be retrieved in accordance with their order in the video asset. Additionally or alternatively, the portions may be retrieved out of order.

In some exemplary embodiments, the Asset Serving Template 128 may include a unique file name for Asset 106. Each session may be associated with a different unique file name, thereby preventing any caching mechanism—be it software cache at Device 190, software cache at Asset Delivery Component 116, a cache server in between CDN 140 and Asset Delivery Component 116, or the like—from being invoked. As a result, each time Asset 106 is accessed by a device such as Device 190, CDN 140 receives an AST-based request, such as 136.

Figure 2:
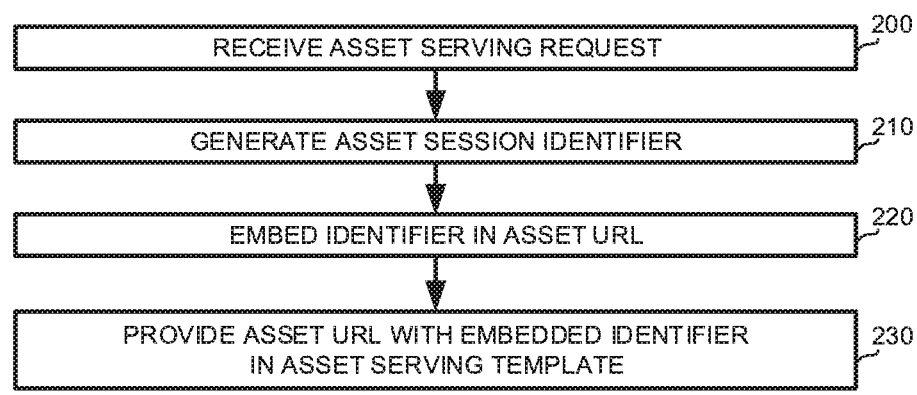
FIG. 2 shows a flowchart diagram of a method, in accordance with some exemplary embodiments of the disclosed subject matter.

Referring now to FIG. 2 showing a flowchart diagram of a method, in accordance with some exemplary embodiments of the disclosed subject matter.

On Step 200, an asset serving request may be received, such as Asset Serving Request 124 of FIG. 1. The asset serving request may be received at an ADS such as 120 of FIG. 1. Responsive to receiving the asset serving request, the ADS may determine which asset should be served, e.g. by selection from a plurality of assets retained on a CDN such as 140 of FIG. 1. Alternatively, the asset serving request may specify a predetermined asset chosen by a different entity, such as another ADS or any likewise asset matching service. Asset matching may be performed based on characteristics of the user, characteristics of the content, or the like.

On Step 210, an asset session identifier may be generated. The asset session identifier may be a unique or pseudo-unique identifier based thereon a unique download request for downloading the asset from a CDN retaining it may be determined. In some exemplary embodiments, the asset session identifier may comprise information relating to one or more of the following: an asset identifier, an asset file identification, an asset placement identification, an asset campaign identification, an asset owner identification, and the like. Additionally or alternatively, the asset session identifier may comprise information enabling to uniquely identify or estimate a user session, such as, for example, a timestamp of the asset serving request, i.e. in which it was received on Step 210, a client IP address, a cookie header, a client device identification, a client user agent identification, a URL pointing to the asset (i.e. a location of the asset in a CDN), and the like.

On Step 220, the asset session identifier generated on Step 210 may be embedded into a URL pointing to the asset chosen for serving, e.g. its storage location in the CDN. The asset session identifier may be incorporated in the URL as a query parameter. Generally speaking, a URL may be in the following format: "scheme:[//authority/]path[?query]", where the scheme component specifies the manner in which the URL is to be used, i.e. a protocol type, e.g. HTTP, HTTPS, FTP, or the like, and optionally required parameters thereof; the authority component specifies the owner or holder of the resource, e.g. a domain name or server IP address; the path component specifies a location in the server file system where the resource is retained; and the query component specifies additional parameters to be transferred to the resource. The query component may be used as part of the URL in HTTP GET request method, whereas in HTTP POST request method the additional query parameters may be specified in a message body section. The URL may be configured to cause recordation of the asset session identifier in an event log of the CDN each time the URL is accessed, e.g. when a request for downloading the asset is made to the CDN. For example, in case an access event entry in the CDN event log contains a full URL of the asset request, the asset session identifier specified therein as a query parameter may be thus integrally logged in that entry. It will be appreciated however that the disclosed subject matter is not limited to this manner of effecting recordation of the asset session identifier, and any other acceptable manner may be employed for this purpose.

In some exemplary embodiments, the asset URL may be a unique URL for the session, such as by incorporating into the name of the asset the session identifier, by incorporating a counter that is incremented at each asset serving request, or the like. The CDN may be configured to perform redirection in response to such a URL to a non-unique URL of the asset. Using such technique may prevent the device from retrieving the asset or portion thereof from a cache and instead ensure that the asset is received from the CDN. As a result of such cache busting technique, each time an asset is served, the CDN is involved and can correctly and accurately log such information.

On Step 230, the asset URL as obtained on Step 220 may be embedded into the asset session identifier as generated on Step 210. The outcome URL may be provided in an asset serving template, such as Asset Serving Template 128 of FIG. 1. The asset serving template may be used by a publisher system or a component thereof, such as Publisher Server 112 or Asset Delivery Component 116 of FIG. 1, for downloading and delivering the asset to a user such as User 195. This may be achieved by accessing the asset at the URL contained in the asset serving template as provided on Step 230. The asset may be retrieved from a CDN being pointed to by the URL as obtained on Step 220, such as CDN 140 of FIG. 1. The asset may be requested from the CDN using an asset request based on the asset serving template, such as AST-Based Request 136 of FIG. 1.

In some exemplary embodiments, the asset serving template provided on Step 230 may comprise one or more beacon URLs for reporting specific events, such as impression quartiles or the like. The beacon URLs may be a part of an industry standard of the asset serving template, such as the VAST 4.0 XML of the IAB and the like. In some exemplary embodiments, a publisher system from which the asset serving request received on Step 200 originated may be known to disable usage of beacon URLs, in which case such beacon URLs may be omitted from the asset serving template provided on Step 230.

In some exemplary embodiments, the asset URL obtained on Step 220 and provided in the asset serving template on Step 230 may be configured to prevent caching of the asset or portions thereof. Additionally or alternatively, the asset URL may be hashed in order to prevent tampering therewith. Similarly, any additional URLs in the asset serving template, such as beacon URLs or the like, may be hashed too.

It is noted that in some exemplary embodiments the disclosed subject matter may be implemented and used without the cooperation of the publisher. Additionally or alternatively, the publisher may be unable to prevent the use of the disclosed subject matter, as opposed to the publisher's ability to prevent use of beacon-based reports, which require its cooperation.

Figure 3:
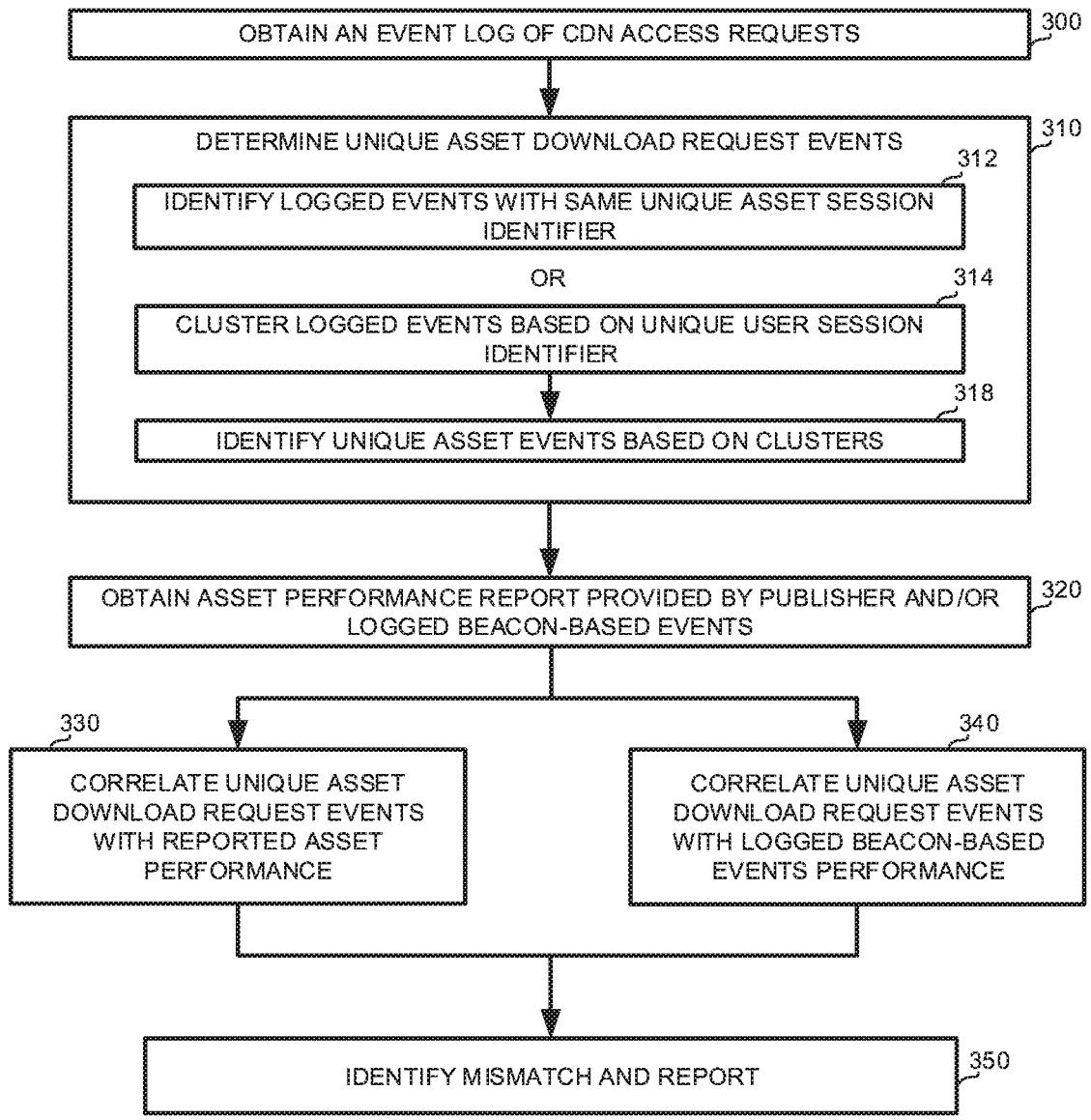
FIG. 3 shows a flowchart diagram of a method, in accordance with some exemplary embodiments of the disclosed subject matter.

Referring now to FIG. 3 showing a flowchart diagram of a method, in accordance with some exemplary embodiments of the disclosed subject matter.

On Step 300, an event log of CDN access requests may be obtained. The event log may comprise a plurality of logged events relating to requests to access assets retained in the CDN. In some exemplary embodiments, a same request for an asset download may generate multiple entries in the event log. For example, a download may be performed in segments or portions due to a total size of an asset, i.e. a number of data bytes. As another example, multiple download requests may improve bandwidth utilization and therefore may be employed. In some exemplary embodiments, a logged event entry in the event log may comprise a full URL of the asset serving request. The URL may comprise an asset session identifier, such as generated, embedded therein and provided within an asset serving template on Steps 210 to 230 of FIG. 2. Additionally or alternatively, the logged event entry may comprise one or more of the following information items: a client IP address; a timestamp of the asset serving request; a cookie header; a client device identification; a client user agent identification; a Hypertext Transfer Protocol (HTTP) header of the asset serving request; a HTTP status code of a response to the asset serving request; an amount of time for start of response to the asset serving request; an amount of time for completion of response to the asset serving request; or the like. In some exemplary embodiments, the event log may further comprise logged beacon events, which may be generated by beacon URLs provided in an asset serving template and configured for being access responsive to a predetermined condition being met. In some exemplary embodiments, the logged beacon events may be logged by a different server and retained separately from the event log.

On Step 310, unique asset download request events for a given asset may be determined. The determination may be made based on analysis of the event log obtained on Step 300. In some exemplary embodiments, the event log may comprise recordation of an asset session identifier for each access event logged in the event log. Logged events having a same asset session identifier associated therewith may be considered as arising from a single request for downloading an asset. Accordingly, on Step 312, logged events having a same asset session identifier associated therewith may be identified in the event log and determined as unique asset download request events.

Additionally or alternatively, on Step 314, logged events may be clustered based on a unique session identifier or an estimation thereof. For example, all events for which a same session information is logged, such as, for example, a client IP address, an AST generation time timestamp, cookie information, and the like, may be considered as events arising from a same user session. On Step 318, unique asset events, in which an asset was provided to a user may be identified based on the clusters. In some exemplary embodiments, the clusters may comprise several logged retrievals of the asset or portion thereof that were performed in connection with a same delivery of the asset. Such retrievals may be grouped together in a cluster. Each cluster may thus be indicative of a different asset delivery.

In some exemplary embodiments, sub-clusters may be determined to account for a time factor. Sub-clusters of a predetermined maximal time range may be determined. The sub-clusters may be useful to prevent from a re-use of an AST to be erroneously counted together with an original usage of the AST. In some exemplary embodiments, each cluster obtained on Step 314 may be further split into sub-clusters based on a timestamp of each of the events comprised therein, such as, for example, according to a timeframe between consecutive timestamps. In some exemplary embodiments, a relative or absolute timeframe threshold may be determined, such that events with timestamps apart exceeding the threshold are grouped into different sub-clusters.

On Step 320, a performance report for an asset as provided by a publisher and/or determined from logged beacon-based events may be obtained. The performance report may comprise performance measures for the asset, such as, for example, impression count, tracking counts, quartile counts, completion counts, or the like. Additionally or alternatively, the publisher may report beacon-based events data. In some exemplary embodiments, logged beacon-based events for the asset may be identified in the event log as obtained in Step 300, and optionally may be further processed to determine performance measures for the asset based thereon.

On Step 330, the unique asset download request events of an asset, as determined on Step 310, may be correlated with the reported performance of the asset as obtained from the publisher on Step 320. In some exemplary embodiments, the unique asset download request events may be counted, and the count may be compared with an impression count or likewise impression statistics reported by the publisher. Additionally or alternatively, the unique asset download request events may be matched against beacon-based events as reported by the publisher. The matching may be performed for example based on recorded timestamps of the events, quartile number and segment of the asset file requested for download, or the like. In some exemplary embodiments, the correlation may be an approximated correlation such as tolerating a difference of up to between about 15% and about 20% or the like. Similarly, on Step 340, the unique asset download request events may be correlated with logged beacon-based events, either by comparing performance measures of the asset as determined based thereon, by matching between events from one set to those in the other, or the like.

On Step 350, a mismatch between the unique asset download request events and the asset performance reported and/or determined from logged beacon-based events, based on the correlations performed on Step 330 and/or Step 340, may be identified and reported.

In some exemplary embodiments, based on the mismatch, a dispute process may be initiated. Additionally or alternatively, in response to a mismatch of a magnitude above a threshold, the publisher may be banned by the advertiser (e.g., owner of the asset). In some cases, the publisher may be banned by the asset matching platform (e.g., owner of the Asset Decision Server). Additionally or alternatively, the publisher may be banned completely or with respect to a certain segment of assets or advertisers. In some exemplary embodiments, if the publisher is banned, the Asset Decision Server may be configured to ignore requests therefrom (completely or selectively), thereby automatically preventing a non-credible publisher from publishing assets. In some cases, a bug may be manifested in the publisher's system and the disclosed subject matter may identify in real-time an adverse effect of the bug. In order to reduce exposure thereto, the publisher may be banned until the bug is fixed.

Figure 4:
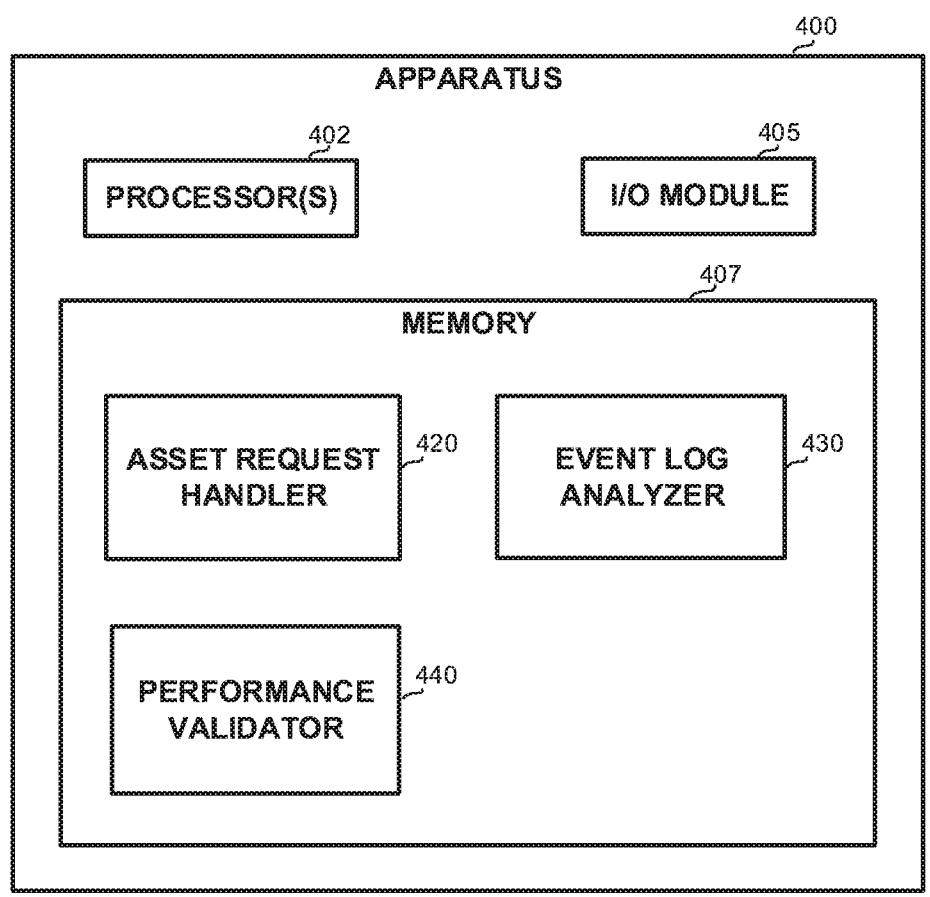
FIG. 4 shows a block diagram of an apparatus, in accordance with some exemplary embodiments of the disclosed subject matter.

Referring now to FIG. 4 showing a block diagram of an apparatus, in accordance with some exemplary embodiments of the disclosed subject matter.

In some exemplary embodiments, Apparatus 400 may comprise one or more Processor(s) 402. Processor 402 may be a Central Processing Unit (CPU), a microprocessor, an electronic circuit, an Integrated Circuit (IC) or the like. Processor 402 may be utilized to perform computations required by Apparatus 400 or any of it subcomponents.

In some exemplary embodiments of the disclosed subject matter, Apparatus 400 may comprise an Input/Output (I/O) module 405. I/O Module 405 may be utilized to provide an output to and receive input from a user or another Apparatus 400.

In some exemplary embodiments, Apparatus 400 may comprise Memory 407. Memory 407 may be a hard disk drive, a Flash disk, a Random Access Memory (RAM), a memory chip, or the like. In some exemplary embodiments, Memory 407 may retain program code operative to cause Processor 402 to perform acts associated with any of the subcomponents of Apparatus 400.

Memory 407 may comprise one or more components as detailed below, implemented as executables, libraries, static libraries, functions, or any other executable components.

Asset Request Handler 420 may be configured to receive asset serving requests and provide in return asset serving templates by which assets may be retrieved and delivered to users, similarly as in Steps 200 to 230 of FIG. 2. Asset Request Handler 420 may be configured to generate a unique asset session identifier as in Step 210 of FIG. 2, based on information related to the asset chosen for serving and/or the request, such as a client IP address, a timestamp of the request, and the like. Asset Request Handler 420 may be configured to embed the asset session identifier in a URL pointing to the asset, as in Step 220 of FIG. 2, e.g. by specifying it as query parameter or the like.

Event Log Analyzer 430 may be configured to receive an event log of access requests to a CDN retaining assets for serving and analyze information contained therein, similarly as in Steps 300 and 310 of FIG. 3. Event Log Analyzer 430 may be configured to determine a count of unique asset download requests of a given asset. Event Log Analyzer 430 may determine unique asset download request events using asset session identifiers recorded in association with logged events, as in Step 312 of FIG. 3. Additionally or alternatively, Event Log Analyzer 430 may determine unique asset download request events using unique session identification and clustering analysis, similarly as in Steps 314 to 318 of FIG. 3. In some exemplary embodiments, Event Log Analyzer 430 may be configured to identify beacon-based events logged in the event log, and optionally to determine tracking counts or likewise performance measures based thereon.

Performance Validator 440 may be configured to receive asset performance data reported by a publisher and/or determined by logged beacon-based events, and unique asset download request events, such as determined by Event Log Analyzer 430, and correlate them with one another, similarly as in Steps 330 and/or 340 of FIG. 3. Performance Validator 440 may be configured to identify a mismatch between the correlated measures and output a report accordingly, similarly as in Step 350 of FIG. 3. In some exemplary embodiments, Performance Validator 440 may be configured to compare computed metrics, such as a count, of asset events, such as impression events, quartile events, or the like, with metrics provided based on a third-party's tracking actions, such as beacon-based reports or reports generated by a third-party platform. Additionally, or alternatively, Performance Validator 440 may be configured to match unique asset download request events with events reported based on third-party tracking actions. In some exemplary embodiments, said matching by Performance Validator 440 may be performed using timestamps of the unique asset download request events and those of the events provided based on the third-party tracking actions. Additionally or alternatively, said matching by Performance Validator 440 may be performed using a portion of the asset that is being retrieved in the download request, so as to match a portion of the asset that would be downloaded when a quartile event is expected, or the like.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for independent validation of asset serving performance, wherein the method is performed in a network that includes a Content Distribution Network (CDN), wherein the CDN retaining a plurality of assets available for download therefrom, the method comprising:

receiving an asset serving request, generated in response to a content request sent by a client device;
responsive to receiving the asset serving request, performing the following:
  selecting an asset from the plurality of assets;
  generating an asset session identifier corresponding to the asset and the asset serving request;
  providing an Asset Serving Template (AST) comprising a Uniform Resource Locator (URL) pointing to the asset, and
  providing to the client device content corresponding to the content request,
  wherein the URL is configured when being used in a download request of the asset from the CDN to effect recordation of the asset session identifier in association with an event logged in an event log associated with the CDN responsive to the download request;
whereby determining unique asset download request events of a given asset of the plurality of assets based on asset session identifiers corresponding to the given asset recorded in association with events logged in the event log, is enabled;
wherein the unique asset download request events are used for validating a reported impression statistic of the given asset, where the reported impression statistic is provided by a third-party publishing system, enabling verification of third-party impression statistics.

2. The method of claim 1, wherein the URL is further configured to prevent caching of the asset.

3. The method of claim 1, wherein the asset session identifier comprises encoding of asset data selected from the group consisting of:
an asset identifier;
an asset file identification;
an asset placement identification;
an asset campaign identification;
an asset owner identification;
and any combination thereof.

4. The method of claim 1, wherein the asset session identifier comprises a unique or pseudo-unique session identification selected from the group consisting of:
a client Internet Protocol (IP) address;
a timestamp of the asset serving request;
a cookie header;
a client device identification;
the URL pointing to the asset of the AST;
a client user agent identification;
a Hypertext Transfer Protocol (HTTP) header of the asset serving request;
a HTTP status code of a response to the asset serving request; an amount of time for start of response to the asset serving request;
an amount of time for completion of response to the asset serving request;
and any combination thereof.

5. The method of claim 1, wherein the AST further comprises at least one beacon URL configured for being accessed responsive to a predetermined condition being met to thereby cause logging of a beacon event, wherein the unique asset download request events are used for validating reported and/or logged beacon events for the given asset.

6. The method of claim 1, wherein the network comprises a third-party publisher system, wherein the asset serving request is issued by the third-party publisher system, wherein the third-party publisher system comprises an asset delivery component configured to access the CDN using the AST a plurality of times to deliver the asset to a user.

7. The method of claim 6, wherein the third-party publisher system is configured to ignore any beacon URLs comprised in the AST and configured for being accessed responsive to a predetermined condition being met to thereby cause logging of a beacon event, whereby the third-party publisher system preventing usage of beacon URLs for validating impression statistics provided by the third-party publisher system, wherein validation of impression statistics is enabled using the unique asset download request events.

8. The method of claim 1 further comprising:
determining, based on real-time analysis of the event log, to prevent asset serving in response to asset serving request from a first third-party publisher system, whereby selective real-time asset blocking is performed with respect to the first third-party publisher system, and whereby asset serving to a second third-party publisher continues uninterruptedly.

9. The method of claim 1, wherein at least one of the plurality of assets is associated with a companion asset, wherein events logged or reported with respect to the companion asset are correlated with the unique asset download request events for validation.

10. The method of claim 1 further comprising computing a number of download requests based on the unique asset download request events in a timeframe, and comparing a number of reported events in the timeframe, wherein the reported events are reported based on actions of a third-party, whereby verifying or refuting the number of reported events provided by the third-party.

11. The method of claim 1 further comprising matching each of the unique asset download request events with reported events, wherein the reported events are reported based on actions of a third-party, whereby verifying or refuting each of the reported events provided by the third-party.

12. An apparatus having a processor and coupled memory, the apparatus being used for independent validation of asset serving performance, the apparatus being in communication with a network that includes a Content Distribution Network (CDN), wherein the CDN retaining a plurality of assets available for download therefrom, the processor being adapted to:
receiving an asset serving request, generated in response to a content request sent by a client device;
responsive to receiving the asset serving request:
select an asset from the plurality of assets;
generate an asset session identifier corresponding to the asset and the asset serving request;
provide an Asset Serving Template (AST) comprising a Uniform Resource Locator (URL) pointing to the asset, and
provide to the client device content corresponding to the content request,
wherein the URL is configured when being used in a download request of the asset from the CDN to effect recordation of the asset session identifier in association with an event logged in an event log associated with the CDN responsive to the download request;
whereby determining unique asset download request events of a given asset of the plurality of assets based on asset session identifiers corresponding to the given asset recorded in association with events logged in the event log, is enabled;
wherein the unique asset download request events are used for validating a reported impression statistic of the given asset, where the reported impression statistic is provided by a third-party publishing system enabling verification of third-party impression statistics.

13. The apparatus of claim 12, wherein the URL is further configured to prevent caching of the asset.

14. The apparatus of claim 12, wherein the AST further comprises at least one beacon URL configured for being accessed responsive to a predetermined condition being met to thereby cause logging of a beacon event, wherein the unique asset download request events are used for validating reported and/or logged beacon events for the given asset.

15. The apparatus of claim 12, wherein said processor being further adapted to:
determine, based on real-time analysis of the event log, to prevent asset serving in response to asset serving request from a first third-party publisher system, whereby selective real-time asset blocking is performed with respect to the first third-party publisher system, and whereby asset serving to a second third-party publisher continues uninterruptedly.

16. The apparatus of claim 12, wherein said processor being further adapted to compute a number of download requests based on the unique asset download request events in a timeframe, and compare a number of reported events in the timeframe, wherein the reported events are reported based on actions of a third-party, whereby verifying or refuting the number of reported events provided by the third-party.

17. The apparatus of claim 12, wherein said processor being further adapted to match each of the unique asset download request events with reported events, wherein the reported events are reported based on actions of a third-party, whereby verifying or refuting each of the reported events provided by the third-party.

18. A non-transitory computer readable medium retaining program instructions, which program instructions when read by a processor, cause the processor to perform a method for independent validation of asset serving performance, wherein the method being performed in a network that includes a Content Distribution Network (CDN), wherein the CDN retaining a plurality of assets available for download therefrom, wherein the method comprising:
receiving an asset serving request, generated in response to a content request sent by a client device;
responsive to receiving the asset serving request:
selecting an asset from the plurality of assets;
generating an asset session identifier corresponding to the asset and the asset serving request;
providing an Asset Serving Template (AST) comprising a Uniform Resource Locator (URL) pointing to the asset, and
providing to the client device content corresponding to the content request,
wherein the URL is configured when being used in a download request of the asset from the CDN to effect recordation of the asset session identifier in association with an event logged in an event log associated with the CDN responsive to the download request;
whereby determining unique asset download request events of a given asset of the plurality of assets based on asset session identifiers corresponding to the given asset recorded in association with events logged in the event log, is enabled;
wherein the unique asset download request events are used for validating a reported impression statistic of the given asset, where the reported impression statistic is provided by a third-party publishing system enabling verification of third-party impression statistics.

19. The method of claim 1, wherein the asset is an advertisement.

20. The apparatus of claim 12, wherein the asset is an advertisement.

21. The method of claim 1, further comprising determining any one or more of the following for the given asset: unique asset initiations count within a timeframe, impressions count within a timeframe, completions count within a timeframe; and a count of impressions that reaches a certain quartile or another percentage count within a timeframe.

22. The apparatus of claim 12, wherein the processor is further adapted to determine any one or more of the following for the given asset: unique asset initiations count within a timeframe, impressions count within a timeframe, completions count within a timeframe; and a count of impressions that reaches a certain quartile or another percentage count within a timeframe.

\* \* \* \* \*